UNITED STATES PATENT OFFICE.

HENRY PETERS, OF LONDON, ENGLAND, ASSIGNOR OF ONE-HALF TO HORACE WAYTH CULLUM, OF LONDON, ENGLAND.

TREATMENT OF CELLULOSE.

1,008,489.  Specification of Letters Patent.  Patented Nov. 14, 1911.

No Drawing.  Application filed September 5, 1911. Serial No. 647,722.

*To all whom it may concern:*

Be it known that I, HENRY PETERS, of 24 Tavistock Square, in the county of London, England, chemist, have invented certain new and useful Improvements Relating to the Treatment of Cellulose, of which the following is a specification.

This invention relates to the treatment of cellulose whereby the same can be brought into a form particularly adapted for the preparation of solutions capable of application for the manufacture of films, threads, coatings, molded articles, and the like.

According to the invention I heat the cellulose for some time with petroleum oil or any other oil, including in this designation glycerin, and after cooling the mass of cellulose and removing the adherent oil therefrom I treat it with a solution containing formic acid and palmitic acid together with a solvent such as methylated spirit, and I then subject the cellulose product to the action of an acetylizing bath which may consist in substance of sulfuric acid, sodium acetate, acetic anhydrid and a condensing agent. The resulting cellulose product may then be treated with a neutralizing solution, preferably a solution of ammonium carbonate in a volatile solvent such as methylated spirit, and the product may be finally washed with water containing ammonium carbonate or other neutralizing agent and finally washed with water and dried.

In carrying out the invention I may proceed for example as follows:—

*Example.* 1 kilogram raw cellulose is heated for about 4 hours in glycerin, or petroleum oil, or any other oil. With petroleum oil the temperature will be maintained at about 40° C., with other oils it will be kept below the boiling point. After the mass has been allowed to cool, the oil is pressed out thoroughly and the cellulose is dried. The cellulose is then put into a bath consisting of 1,000 grams methylated spirit, 50 grams acidum formicicum ($HCO_2H$), and 20 grams of palmitic acid ($C_{16}H_{32}O_2$). The cellulose is steeped or pressed until it has been thoroughly impregnated by the liquid. After 4 hours the whole mass is put into a bath consisting of:—3½ liters glacial acetic acid or other condensing agent; 3 liters acetic anhydrid; 100 grams sulfuric acid; 10 grams sodium acetate. This mass must be cooled down and always kept below 50° C. After about 10 hours the whole is poured into methylated spirit containing about 30 grams ammonium carbonate per liter. The cellulose product is left in this for about 6 hours, then the liquid is filtered off and the product is put into water containing 30 grams ammonium carbonate per forms very strong non-nflammable films and dried.

A cellulose product prepared in this manner dissolves very easily in acetone, glacial acetic acid and other solvents, and only needs about half the quantity of solvents required for ordinary cellulose acetate. It forms very strong noninflammable films and retains its elasticity.

What I claim and desire to secure by Letters Patent is:—

1. A process for the treatment of cellulose, comprising (*a*) heating the cellulose with an oil; (*b*) subsequent treatment with a solution of formic acid, palmitic acid and a volatile solvent; (*c*) subjecting the resulting product to the action of an acetylizing bath substantially as described.

2. A process for the treatment of cellulose, comprising (*a*) heating the cellulose with glycerin; (*b*) subsequent treatment with a solution of formic acid, palmitic acid and a volatile solvent; (*c*) subjecting the resulting product to the action of an acetylizing bath, substantially as described.

3. A process for the treatment of cellulose comprising (*a*) heating the cellulose with an oil; (*b*) subsequent treatment with a solution of formic acid, palmitic acid and a volatile solvent; (*c*) subjecting the resulting product to the action of an acetylizing bath containing sulfuric acid, substantially as described.

4. A process for the treatment of cellulose comprising (*a*) heating the cellulose with an oil at a temperature below the boiling point; (*b*) subsequent treatment with a solution of formic acid, palmitic acid and alcohol; (*c*) subjecting the resulting product to the action of an acetylizing bath consisting in substance of acetic anhydrid, an alkali acetate, sulfuric acid and a condensing agent substantially as described 5. A process for the treatment of cellulose comprising (*a*) heating the cellulose with an oil; (*b*) subsequent treatment with a solution of formic acid, palmitic acid and a volatile solvent; (*c*) subjecting the resulting product to the action of an acetylizing bath; (d) neutralizing, washing and drying the resulting product.

6. A process for the treatment of cellulose, comprising (a) heating the cellulose with an oil and removing remaining oil from the cellulose; (b) subsequent treatment with a solution of formic acid, palmitic acid and a volatile solvent; (c) subjecting the resulting product to the action of an acetylizing bath consisting in substance of acetic anhydrid, sodium acetate, sulfuric acid and a condensing agent.

7. A process for the treatment of cellulose comprising heating the same with an oil and subsequent treatment with a solution of formic acid, palmitic acid and a volatile solvent.

8. A process for the treatment of cellulose, comprising heating the same with glycerin and subsequent treatment with a solution of formic acid, palmitic acid and a volatile solvent.

In testimony whereof I have hereunto set my hand in presence of two subscribing witnesses.

HENRY PETERS.

Witnesses:
HENRY ALLEN PRYOR,
ROBERT MILTON SPEARPOINT.

Correction in Letters Patent No. 1,008,489.

It is hereby certified that in Letters Patent No. 1,008,489, granted November 14, 1911, upon the application of Henry Peters, of London, England, for an improvement in "The Treatment of Cellulose," an error appears in the printed specification requiring correction as follows: Page 1, line 63, strike out the words " forms very strong non-inflammable films" and insert the words *per litre. Then the product is well washed;* and that the said Letters Patent should be read with this correction therein that the same may conform to the record of the case in the Patent Office.

Signed and sealed this 28th day of May, A. D., 1912.

[SEAL.]

C. C. BILLINGS,
*Acting Commissioner of Patents.*